United States Patent
An et al.

(10) Patent No.: US 8,200,628 B2
(45) Date of Patent: Jun. 12, 2012

(54) MULTI-TENANCY DATA STORAGE AND ACCESS METHOD AND APPARATUS

(75) Inventors: Wenhao An, Beijing (CN); Bo Gao, Beijing (CN); Chang Jie Guo, Beijing (CN); Zhong Su, Beijing (CN); Wei Sun, Beijing (CN); Zhi Hu Wang, Beijing (CN); Zhen Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 12/493,315

(22) Filed: Jun. 29, 2009

(65) Prior Publication Data

US 2010/0005055 A1 Jan. 7, 2010

(30) Foreign Application Priority Data

Jun. 30, 2008 (CN) .......................... 2008 1 0127272

(51) Int. Cl.
*G06F 7/00* (2006.01)
(52) U.S. Cl. ....................................... 707/636; 707/720
(58) Field of Classification Search .................. 707/636, 707/713, 720, 809
See application file for complete search history.

(56) References Cited

U.S. PATENT DOCUMENTS

| | | | |
|---|---|---|---|
| 2005/0065925 A1 | 3/2005 | Weissman | |
| 2007/0124276 A1* | 5/2007 | Weissman et al. | 707/2 |
| 2007/0130137 A1* | 6/2007 | Oliver et al. | 707/5 |
| 2007/0156901 A1 | 7/2007 | Becker | |
| 2008/0270459 A1* | 10/2008 | Grewal et al. | 707/103 R |

OTHER PUBLICATIONS

Chang Jie Guo, "A Framework for Native Multi-Tenancy Application Development and Management", IEEE 2007.

* cited by examiner

*Primary Examiner* — Amy Ng
(74) *Attorney, Agent, or Firm* — Gail H. Zarick; Otterstedt, Ellenbogen & Kammer, LLP

(57) ABSTRACT

A method, apparatus, and a computer program product for storing and accessing multi-tenancy data. The method includes the steps of: creating a plurality of table sets in one or more databases, wherein each table set is used to store data of a group of tenants selected from a plurality of tenants; accessing data of a tenant in a table set in response to receiving a data access request from the tenant; and recording relationships between the tenants and the table sets in a multi-tenancy metadata repository, wherein the step of accessing the data of the tenant comprises the steps of finding the table set by querying the metadata repository and accessing the data of the tenant in the table set based on the result received from the query of the metadata repository.

11 Claims, 9 Drawing Sheets ize">
MULTI-TENANCY DATA STORAGE AND ACCESS METHOD AND APPARATUS

CROSS-REFERENCE TO RELATED APPLICATIONS

This application claims priority under 35 U.S.C. §119 from Chinese Patent Application No. 200810127272.2 filed Jun. 30, 2008, the entire contents of which are incorporated herein by reference.

BACKGROUND OF THE INVENTION

1. Field of the Invention

The present invention relates to data processing field, particularly to the multi-tenancy technology, and more particularly to a multi-tenancy data storage and access method and apparatus.

2. Description of the Related Art

The multi-tenancy technology refers a single instance of software that runs on a service provider's server and provides service to many client organizations (i.e., tenants), especially small and medium-sized enterprises (SMEs). FIG. 1 is an exemplary schematic illustration of the architecture of a multi-tenancy application. In a scenario of a large-scale multi-tenancy application, there may be many (e.g., over 1 million) SME tenants accessing the application instance on a hosting platform at the same time. With the large increase of the number of tenants, a multi-tenancy application will face the following challenges: the first is to keep a relatively low and stable resource use costs per tenant, and at the same time to keep an acceptable performance level per tenant; the second is to keep a relatively low management complexity, such as in cross-tenant operations, tenant registration, etc. The current typical multi-tenancy technology uses at least one of three physical data storage or sharing modes as illustrated in FIG. 2.

The first is a separate database mode, in which each tenant owns a separate database. This mode has a number of disadvantages. Taking a current primary relational database system as an example, building a new database each time requires about 80M default disk space. As such, if 300 databases are required, 24 G disk space will be needed; if 500 databases are required, 40 G disk space will be needed. Further, during runtime, a database will consume a relatively large memory space. For example, 300 databases themselves need at least 2.4 G memory space, and 500 databases need at least 3 G memory space. Additionally, with the increase of the number of tenants, the overall system database access performance level may decrease dramatically. Due to the above disadvantages, such separate database mode is only practically applicable to scenarios where the number of tenants is small and the tenants are large-scale ones.

The second mode is a shared database and shared table mode, in which all tenants share a same table set (that is, a set of tables for a specific application) in a same database. As such, a new field "Tenant ID" needs to be added to each table in the table set in order to distinguish between data of different tenants. The advantages of such a mode include: (i) it is easy to perform cross-tenant management operations since there is only one table set; (ii) to build a database only needs about 80M disk space by default; (iii) during runtime, the database itself consumes about 600-700M memory space by default. However, the disadvantage of such a mode is that with the number of tenants increasing to a very large number (e.g., over 1000), there will occur a break point where multi-tenancy data will interfere severely with each other, and the overall system data access performance decreases dramatically.

The third mode is a shared database and separate table mode in which all tenants share a same database with each tenant owning its separate table set. The advantages of such a mode is that, even with the number of tenants increasing to a very large number, there will not occur a break point where the overall system data access performance decreases dramatically. To build a database only about 80M disk space is needed by default and during runtime the database itself consumes about 600-700M memory space by default. The disadvantage of such a mode, however, is that, since the number of table sets is equal to the number of tenants, with the number of tenants increasing, the number of table sets will become very large. As such, cross-tenant management operations, such as tenant registration, will become extremely complex.

FIG. 3 illustrates the overall system data access performance of an exemplary multi-tenancy application varying with the increase of the number of tenants under the three modes. As shown, the performance under the shared database and separate table mode is relatively high and stable with the increase of the number of tenants. The performance under the shared database and shared table mode is lower and, with the number of tenants increasing to about 1000, there will occur a break point where the overall system data access performance decreases dramatically. The overall system data access performance under the separate database mode will decrease dramatically with the increase of the number of tenants.

Accordingly, there is a need for a multi-tenancy data storage solution which can both keep the overall system data access performance stable with the large increase of the number of tenants and, at the same time, maintain low management costs.

SUMMARY OF THE INVENTION

In one aspect of the invention, there is provided a multi-tenancy data storage and access method, including the steps of: creating a plurality of table sets in one or more databases, wherein each table set is used to store data of a group of tenants selected from a plurality of tenants; accessing data of a tenant in a table set in response to receiving a data access request from the tenant; and recording relationships between the tenants and the table sets in a multi-tenancy metadata repository, wherein the step of accessing the data of the tenant comprises the steps of finding the table set by querying the metadata repository and accessing the data of the tenant in the table set based on the result received from the query of the metadata repository.

In another aspect of the invention, there is provided a multi-tenancy data storage and access apparatus including: a creation processing module configured to create a plurality of table sets in one or more databases, wherein each table set is used to store data of a group of tenants selected from a plurality of tenants; a multi-tenancy data router configured to access data of a tenant in a table set in response to receiving a data access request from the tenant; and a multi-tenancy metadata repository for recording the corresponding relationships between tenants and table sets; wherein the multi-tenancy data router is further configured to find the table set by querying the metadata repository and access the data of the tenant in the table set based on a result received from the query of the metadata repository.

In yet another aspect of the invention, there is provided a computer program product tangibly embodying a computer readable code that when executed causes the computer to store and access multi-tenancy data according to the above method.

The advantage of the invention is to ensure both relatively high performance and relatively low management costs when the number of tenants is very large. Specifically, since compared to the share database and separate table mode, the number of table sets is reduced, resource utilization is enhanced, and the management costs of cross-tenant operations, etc. are lowered. In addition, under certain table share rate, that is, the number of tenants to which each table set corresponds, even if the number of tenants increases to a very large number, e.g., over 4000 tenants, the overall system data access performance remain close to that under the share database and separate table mode.

DETAILED DESCRIPTION OF THE PREFERRED EMBODIMENTS

Embodiments of the present invention will be described below with reference to the drawings. In the following description, numerous details are set forth in order for the present invention to be thoroughly understood. Those skilled in the art will know that the implementation of the present invention can be without those details. Additionally, it should be appreciated that the present invention is not limited to the described particular embodiments. Rather, the present invention can be implemented and practiced by using any combination of the following features and elements, regardless of whether they involve different embodiments. Therefore, the following aspects, features, embodiments and advantages are used only for illustration, and shall not be deemed as elements or limitation of the attached claims, except as explicitly set forth in the claims.

Figure 1:
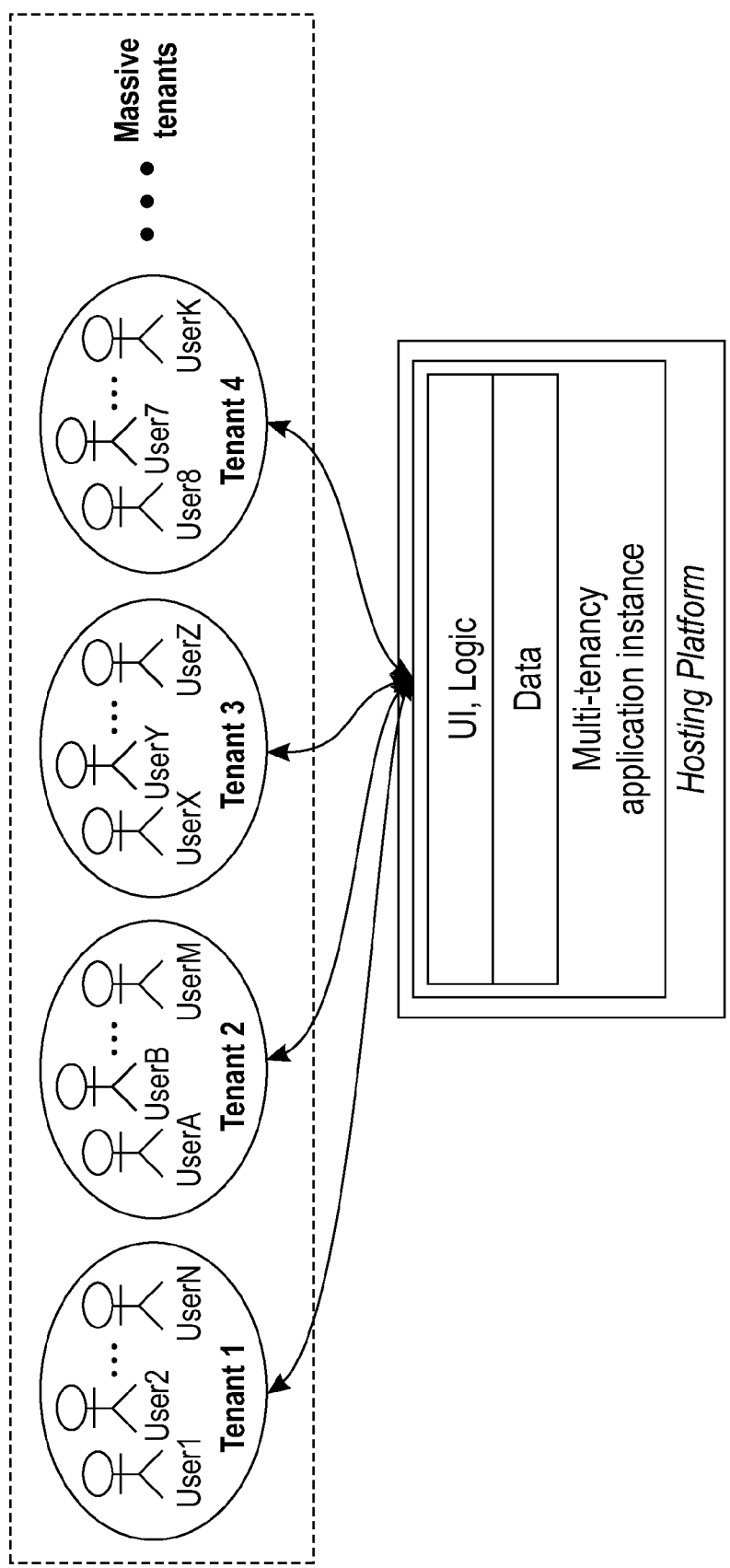
FIG. 1 is an exemplary schematic illustration of the architecture of multi-tenancy applications.
Figure 2:
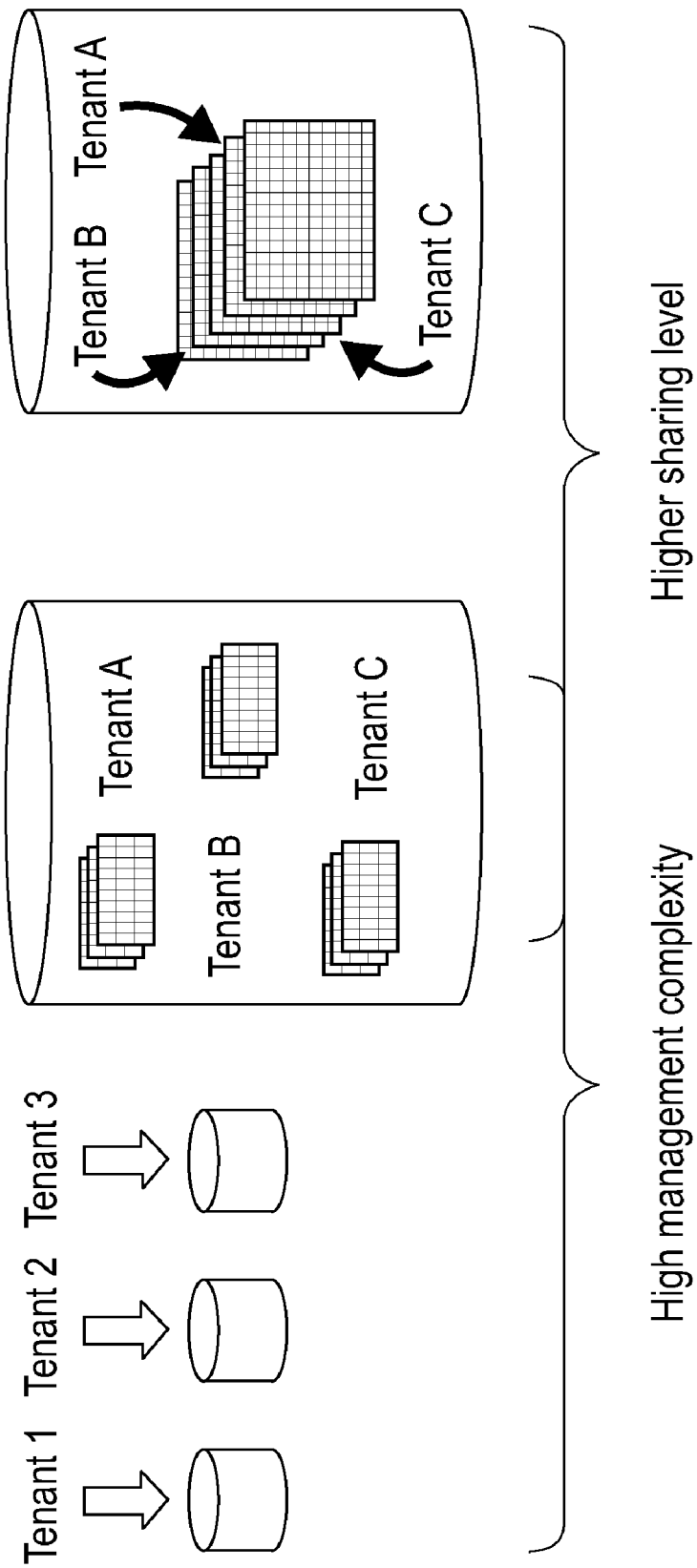
FIG. 2 illustrates the three typical physical data storage or sharing modes used in the prior art multi-tenancy technology.
Figure 3:
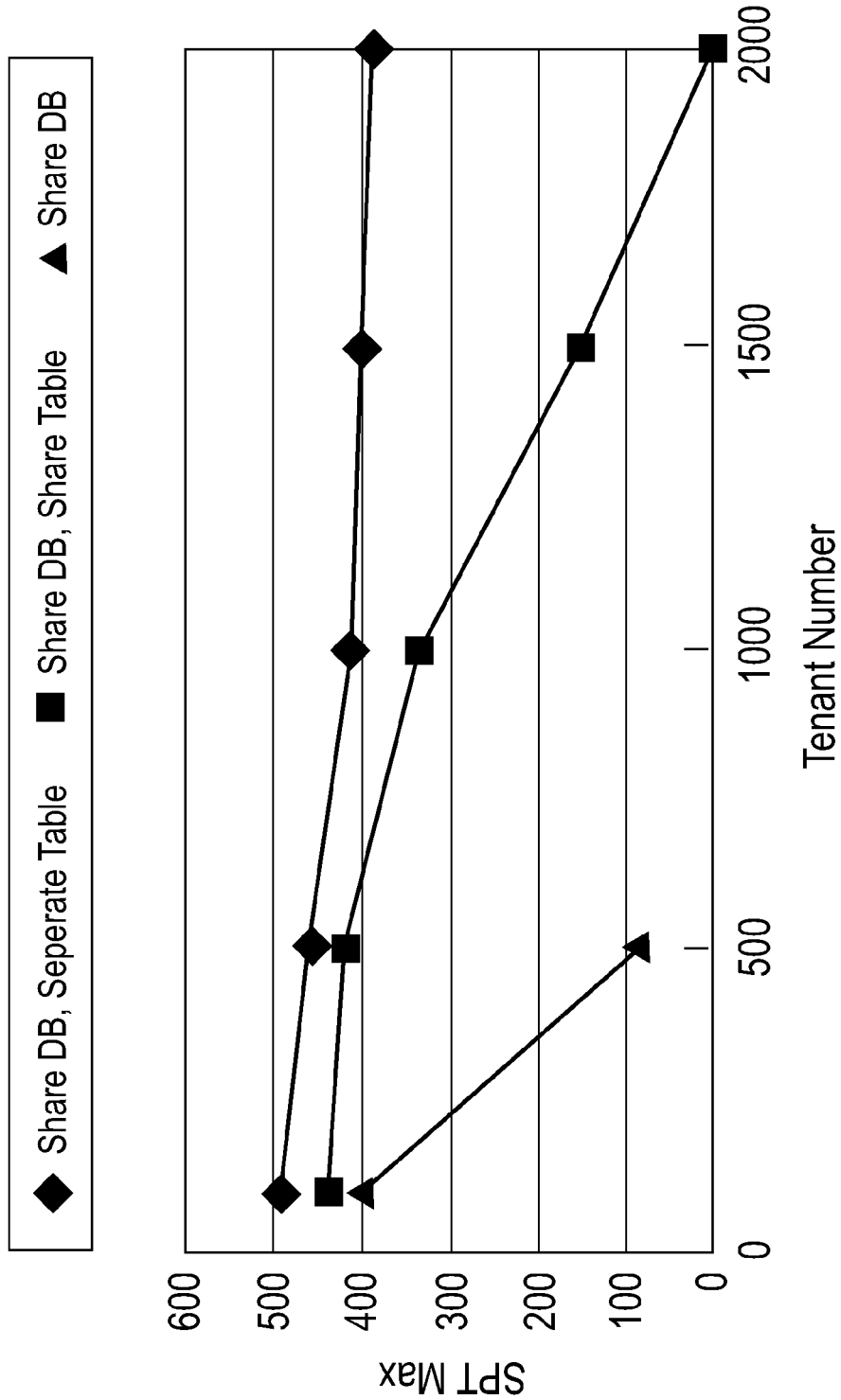
FIG. 3 is a graph that illustrates how the performance of an exemplary multi-tenancy application varies with the increase of the number of tenants.
Figure 4:
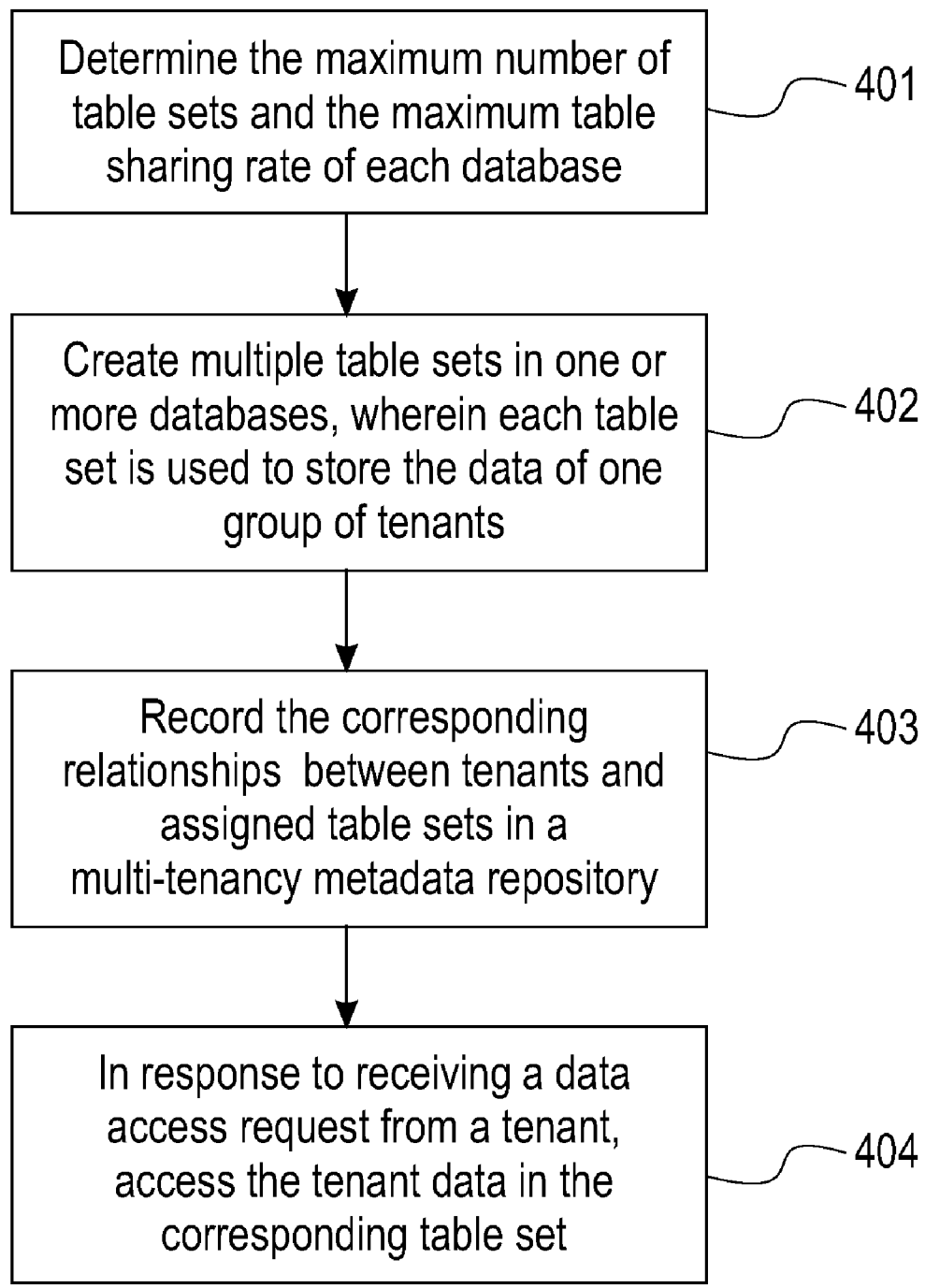
FIG. 4 is a flow chart showing a multi-tenancy data storage and access method according to an embodiment of the present invention.

FIG. 4 shows a multi-tenancy data storage and access method according to an embodiment of the present invention.

As shown, in an optional step 401, the maximum number of table sets and the maximum table sharing rate of each database in one or more databases of the multi-tenant application are determined. The table sharing rate refers to the number of tenants contained in each table set. Various methods can be used to determine the maximum number of table sets and the maximum table sharing rate, such as, determining by the user through experience or determining by using the emulation method as described below with reference to FIG. 7.

In step 402, multiple table sets are created in the one or more databases, wherein each table set is used to store the data of one group of tenants of the multiple tenants. The group of tenants is referred to as a sharing group and the number of tenants included in the sharing group is the table sharing rate. In different embodiments of the present invention, the table sharing rate can be different, such as 500, 100, 25, 10, etc.

Data in a same table set belonging to tenants of a same sharing group can be distinguished by the tenant IDs.

Different table sets for storing data of tenants of different sharing group can be stored in the same or different databases.

Creating multiple table sets in one or more databases may be performed based on the determined maximum number of table sets in each database and the maximum table sharing rate of each table set. That is, the number of table sets created in each database does not exceed the determined maximum number of table sets, and the number of tenants in a sharing group to which each table set corresponds does not exceed the determined maximum table sharing rate.

Figure 5:
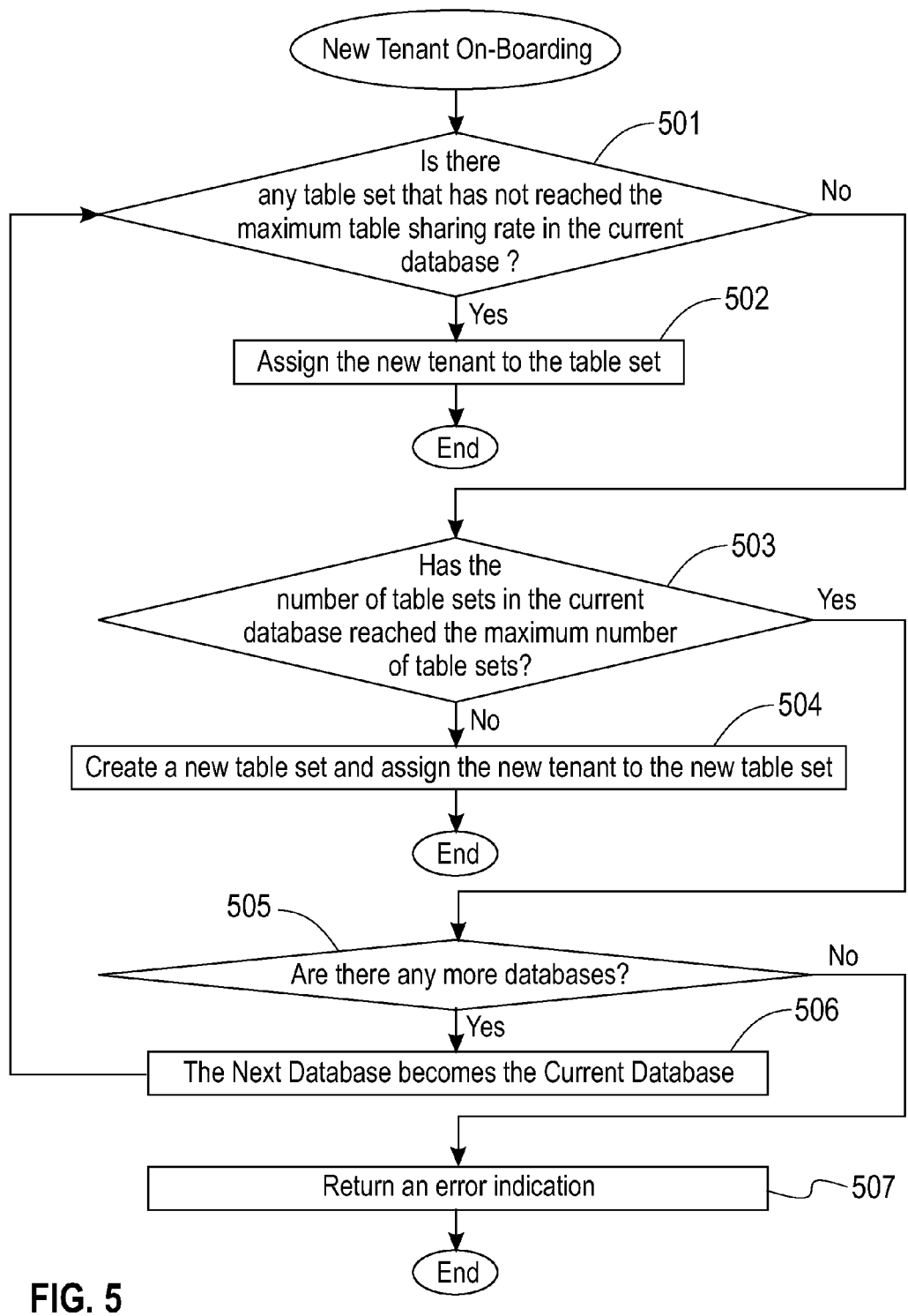
FIG. 5 is a flow chart showing the specific steps for creating and assigning sharing groups and table sets based on a minimum table set number policy according to an embodiment of the present invention.
Figure 6:
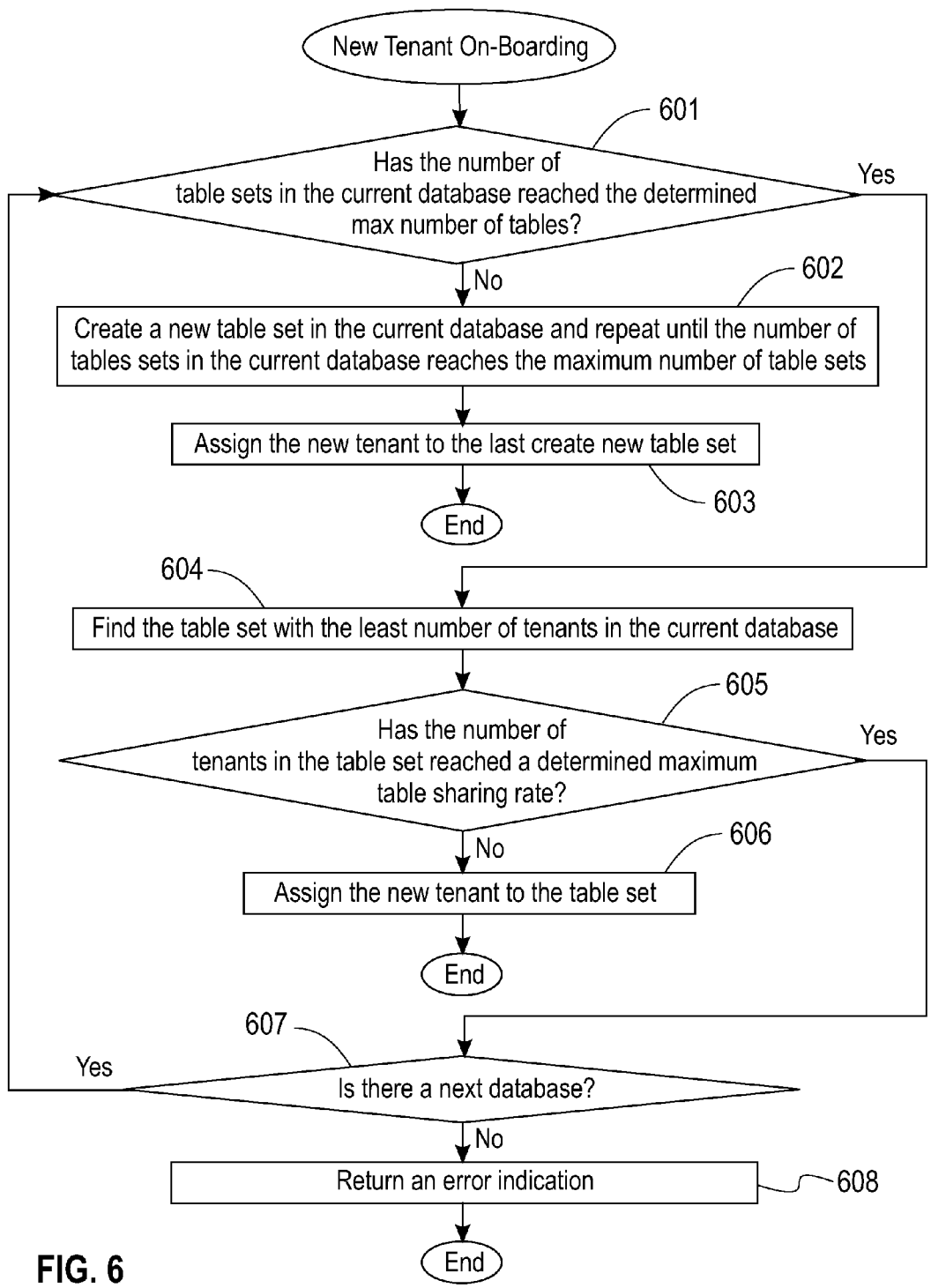
FIG. 6 is a flow chart showing the specific steps for creating and assigning sharing groups and table sets based on a maximum performance policy according to an embodiment of the present invention.

According to a predetermined policy, when a new tenant is on-boarding either: (i) an existing sharing group and a corresponding table set are selected and the new tenant is assigned to the existing sharing group and the corresponding table set, or (ii) a new sharing group and a corresponding table set are created and the new tenant is assigned to the newly-created sharing group and the corresponding table set. The flow charts detailing the steps when a new tenant is on-boarding according to different predetermined policies are shown in FIG. 5 and FIG. 6 and will be discussed further below.

Whenever a new tenant is assigned to an existing or newly-created table set, in an optional step 403, the corresponding relationships between tenants and assigned table sets are recorded in a multi-tenancy metadata repository. For example, in the metadata repository are recorded each tenant ID and the sequence number of the corresponding table set. In this way, whenever a data access request is received from a tenant, a corresponding table set can be found in the multi-tenancy metadata repository based on the ID of the tenant in order to access to the corresponding data of the tenant in a table in the corresponding table set. The metadata repository may also store accessing addresses, such as URLs, of database system units.

In step 404, in response to receiving a data access request from a tenant, the tenant data is accessed in the corresponding table set.

Accessing the tenant data in the corresponding table set includes finding the corresponding table set by querying the multi-tenancy metadata repository and accessing the corresponding tenant data in the corresponding table set.

If the data access request contains a SQL statement for data access, then accessing the tenant data in the corresponding table set includes extracting and parsing the SQL statement contained in the data access request, modifying the SQL statement into a corresponding SQL statement for accessing the corresponding data of the tenant in the corresponding table set, and sending the modified SQL statement to the corresponding database.

In the following, the specific execution process of step 404 will be illustrated by example.

First, for example, a tenant sends to a multi-tenancy application a data access request containing the SQL statement as follows: select * from T_SALESORDER where signdate>'2007-01-05' and signdate<'2007-01-24'.

Second, the apparatus of the invention intercepts the request, obtains the tenant ID of the current request, and finds the table sequence number and the access URL of the database system unit corresponding to the tenant ID from the multi-tenancy metadata repository through a multi-tenancy metadata manager. For example, through the system program interface or security session mechanism of the multi-tenancy application, the tenant ID of the current tenant is obtained as "tenantA", and the corresponding table set sequence number is obtained from the multi-tenancy database as "00000001".

Third, the apparatus of the invention parses the SQL statement, and modifies the SQL statement using the found tenant ID and the corresponding table set sequence number. For example, the SQL statement is modified into: select * from T_SALESORDER_00000001 where tenantID='tenantA' and signdate>'2007-01-05' and signdate<'2007-01-24'.

Forth, the apparatus of the invention re-issues the tenant request with the modified SQL statement to the access URL of the corresponding database system unit.

FIG. 5 shows the specific steps for creating and assigning sharing groups and table sets based on a minimum table set number policy according to an embodiment of the invention.

As shown, in step 501, in response to a new tenant on-boarding, it is determined whether there is any table set that has not reached the maximum table sharing rate in the current database.

If the determination is Yes, the process turns to step 502, where the new tenant is assigned to the table set, and the process ends.

If the determination is No, the process turns to step 503, where it is further determined whether the number of table sets in the current database has reached the maximum number of table sets.

If the further determination is No, the process turns to step 504, where a new table set is created, the new tenant is assigned to the new table set and then the process ends.

If the further determination is Yes, the process turns to step 505, where it is determined whether there is any more databases.

If the determination is Yes, the process turns to step 506, where the next database is regarded as the current database, and then the process returns to perform step 501.

If the determination is No, the process turns to step 507, where an error indication is returned, and the process ends.

The above process is repeated for each new tenant on-boarding.

In another embodiment of the invention, the predetermined policy for creating and assigning sharing groups and table sets is a maximum performance policy.

FIG. 6 shows the specific steps for assigning and creating sharing groups and table sets based on the maximum performance policy according to an embodiment of the present invention.

As shown, in step 601, in response to a new tenant on-boarding, it is determined whether the number of table sets in the current database has reached the determined maximum number of table sets.

If the determined is No, the process turns to step 602, where a new tables set is created in the current database according to the maximum number of table sets in the database until the number of table sets in the current database has reached the maximum number of table sets. Then, in step 603, the new tenant is assigned to the last created new table set, and the process ends.

If the determination is Yes, the process turns to step 604, where the table set with the least number of tenants is found in the current database. And then in step 605, it is determined whether the number of tenants in the table set has reached a determined maximum table sharing rate.

If the determination is No, in step 606, the new tenant is assigned to the table set and the process ends.

If the determination is Yes, indicating there is no usable table set in the current database, the process turns to step 607, where it is determined whether there is next database.

If the determination is Yes, the process returns to perform step 601 on the next database.

If the determination is No, the process turns to step 608, where an error indication is returned and the process ends.

The above process is performed repeatedly for each new tenant on-boarding.

It is noted that the policies for creating and assigning sharing groups and table sets according to embodiments of the invention as described above are only exemplary. They are not to be considered limitations to the invention. In other embodiments of the invention, other policies can be used for creating and assigning sharing groups and table sets. Additionally, in some embodiments of the invention, the specific steps in the minimum table set number policy and the maximum performance policy may be different from that described above.

Each created table set may have a unique sequence number and the name of each table in the table set is the concatenation of the name of the original table in the database schemas of the multi-tenancy application and the sequence number of the table set. For example, if the name of the original table is "SalesOrder", the names of newly created tables will be "SalesOrder_00000001", "SalesOrder_00000002", etc.

Each table in each table set that is created may have the same fields as the original table, as well as a newly added filed "tenantID", which is used to distinguish between data belonging to different tenants in the same sharing group in the same table.

Figure 7:
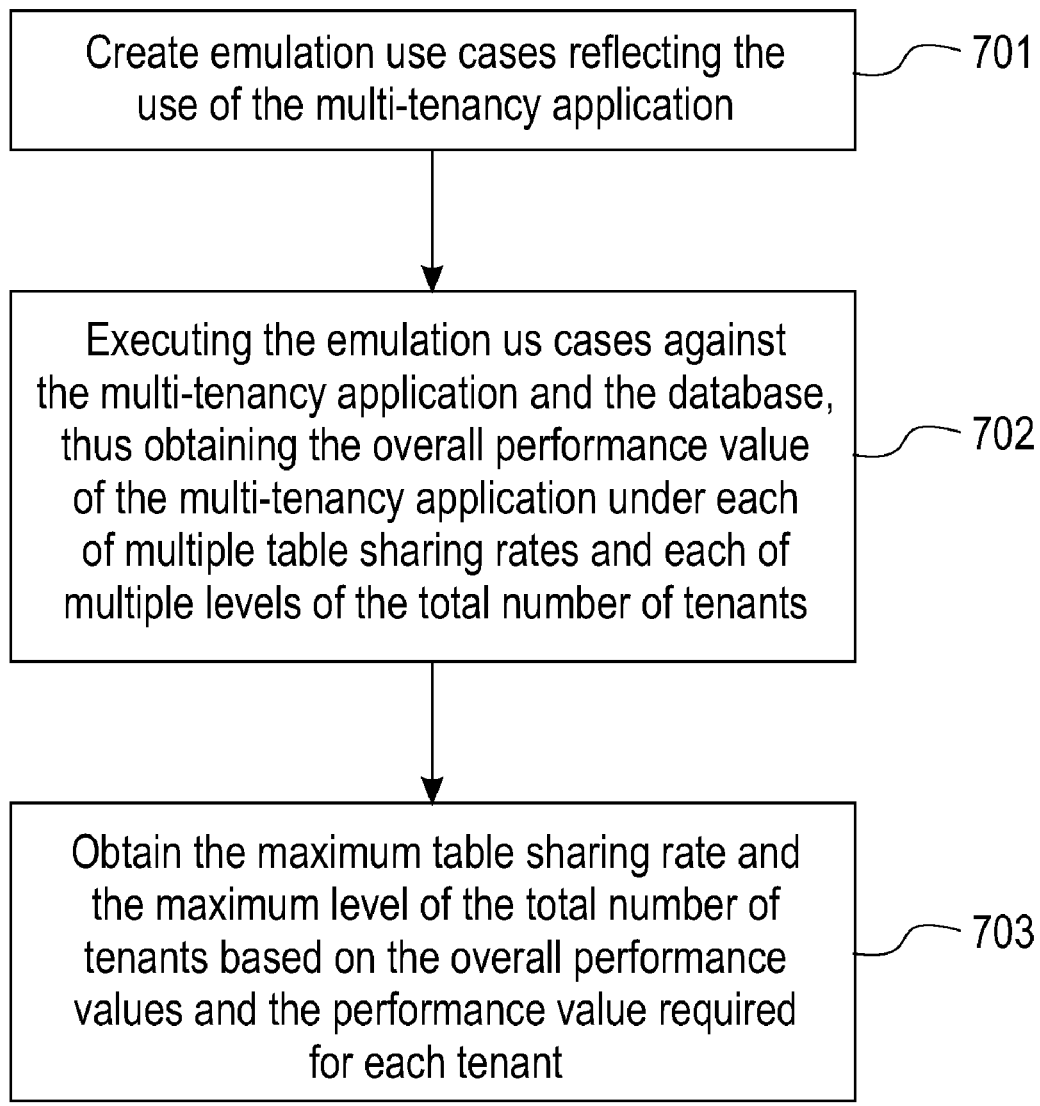
FIG. 7 is a flow chart showing a method for obtaining a sharing scheme for storing multi-tenancy data of a multi-tenancy application in a database according to an embodiment of the present invention.

The specific steps for executing step 401, that is, determining the maximum number of table sets and the maximum table sharing rate, through an emulation method according to an embodiment of the invention will be described below with reference to the FIG. 7.

In step 701, emulation use cases reflecting the use of the multi-tenancy application are created.

In step 702, the emulation use cases are executed against the multi-tenancy application and the database, thus obtaining the overall performance value of the multi-tenancy application under each of multiple table sharing rates and each of multiple levels of the total number of tenants.

In step 703, the maximum table sharing rate and the maximum level of the total number of tenants are obtained based on the overall performance values and the performance value required for each tenant. This also allows for the maximum number of table sets of the database to be obtained.

According to an embodiment of the invention, obtaining the maximum table sharing rate and the maximum level of the total number of tenants is further based on the percentage of decrease of the total number of tenants that can be tolerated by the provider of the multi-tenancy application caused by the increase of the table sharing rate on the condition that the performance value required for each tenant remains unchanged.

According to an embodiment of the invention, the step of obtaining the maximum table sharing rate and the maximum level of the total number of tenants includes the steps detailed below.

First, obtain the level of the total number of tenants satisfying the performance value required for each tenant when the table sharing rate is 1 based on the overall performance values under various levels of the total number of tenants when the table sharing rate is 1.

Second, obtain the maximum level of the total number of tenants that can be accepted by the provider based on the level of the total number of tenants satisfying the performance value required for each tenant when the table sharing rate is 1 and the percentage of decrease of the total number of tenants that can be tolerated by the provider of the multi-tenancy application.

Third, obtain the maximum table sharing rate by comparing the overall performances of the multi-tenancy application under various table sharing rates and maximum level of the total number of tenants, wherein the overall performance value satisfies the performance value required for each tenant under the maximum level of the total number of tenants.

The specific steps for obtaining the maximum number of table sets and the maximum table sharing rate of each table set according to an embodiment of the invention will now be described by example with reference to FIG. 8.

First, emulation use cases are built based on the use information of the multi-tenancy application. A typical mixed use case of a multi-tenancy application includes the following contents:

1) SQL Operations Properties
  a) SQL operation scripts: a series of SQL operations (select, insert, update, etc.) which are consistent with real typical mixed use cases
2) Table Properties
  a) Table generation scripts of the multi-tenancy application
  b) Emulation business data generation scripts of the multi-tenancy application
  c) Records amount per tenant on each table
3) Performance Target Property
  a) Boundary TPS (transactions per second): TPS per tenant required of the mixed use case (e.g., based on SLA)
  b) Tolerated decrease percentage of the total number of tenants: the decrease percentage of the total number of tenants that can be tolerated by the provider of the multi-tenancy application, with the increase of TSR (table sharing rate) under the condition that the boundary TPS remains unchanged.
4) Scale Property
  a) Tenant number scale difference
  b) TSR scale difference
  c) Boundary scale rate:
    i) Scale rate: maximum TPS decreased difference value of the overall system unit/tenant number scale value
    ii) If the current scale rate exceeds the boundary one, the current tenant number is a break point Those skilled in the art can easily build appropriate emulation use cases based on the above description of the use case.

Second, the overall performances of a multi-tenancy application under various table sharing rates and levels of the total number of tenants can be obtained by executing the above use cases against the multi-tenancy application.

Figure 8:
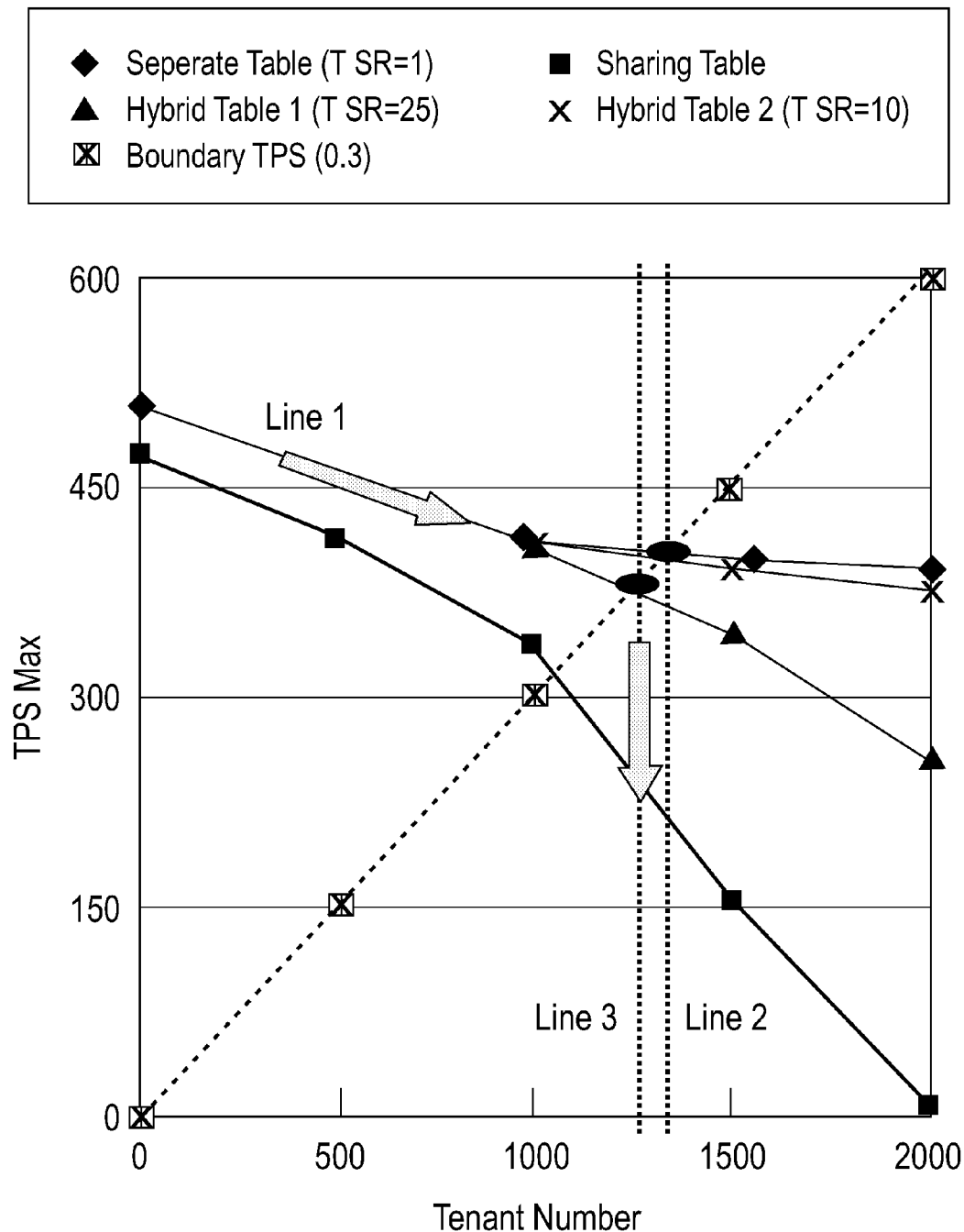
FIG. 8 shows the specific steps of the method for obtaining a sharing scheme for storing multi-tenancy data of a multi-tenancy application in a database according to an embodiment of the present invention.

For example, as shown in FIG. 8, to emulate Line 1 under TSR=1, that is, the separate table mode the tenant number scale difference is 500 and under each scale level of the tenant number, business data is created in the target table. The increased data size=(number of records of each tenant)*(tenant number scale difference). Multiple clients request to perform operations simultaneously according to the emulation use cases in order to obtain the maximum overall TPS of the system unit. It is also preferred to monitor system bottlenecks, such as CPU time %, disk idle time %, memory utilization, etc.

Third, the maximum total number of tenants supported by the database system unit is determined.

If there is a breakpoint in Line 1 obtained in the second step (that is, the current scale rate exceeds the boundary scale rate), then a point between the last scaling point and the breakpoint may be the maximum number of tenants. At this time, the tenant number scale difference may be set to a smaller value, and emulation is performed once again, until the maximum total number of tenants is precisely located.

If there is no break point, but Line 1 and the boundary TPS intersect at a point, the scaling of the number of tenants is stopped, and the intersection point represents the maximum total number of tenants under the separate table mode. In the example shown in FIG. 8, the maximum total number of tenants is 1375, as shown by Line 2.

Based on the maximum total number of tenants and the tolerated decreased percentage of the number of tenants (10% in the example shown in FIG. 8), the appropriate number of tenants acceptable to the provider of the multi-tenancy application is obtained. In the example shown in the figure, the appropriate number of tenants acceptable to the provider is 1375*90%=1250, as shown in Line 3.

Fourth, the maximum TSR is determined based on the boundary TPS. When the appropriate number of tenants acceptable, as obtained in the third step, is fixed (Line 2), the current maximum total TPS is obtained by increasing the TSR according the scaling difference of the TSR, and is ensured to be greater than the total TPS value under the current boundary TPS (in the example shown in FIG. 8, the total TPS value is 0.3*1275=375). Thereby, the maximum TSR is obtained, which is 25 in the example shown in FIG. 8.

Thus, the appropriate data sharing scheme of the exemplary multi-tenancy application, as obtained by the example shown in FIG. 8, is the maximum level of the total number of tenants is 1250, the maximum table sharing rate (TSR) is 25, and the maximum number of table sets is 50.

The above process can either: (i) be performed on a single database system unit, and the obtained maximum number of table sets and the maximum table sharing rate can be applied to other database system units; or (ii) be performed on each database system unit separately, thus obtaining the respective maximum number of table sets and the maximum table sharing rate of each database system unit.

It should noted that the above description is illustrative and not a limitation to the invention. In other embodiments of the invention, the method can have more, less or different steps, and the order between the steps may be different from that described. For example, in some embodiments of the invention, there may be without one or more of the above optional steps, and the specific implementation of each step may be different from that described. As another example, in some embodiments of the invention, additionally or alternatively, the actual use data of a multi-tenant application can be obtained by monitoring the actual use of the multi-tenant application. Then the actual use data can be used to create or modify use cases, and the use cases can be executed on the multi-tenancy application in order to obtain the appropriate maximum number of table sets and maximum sharing rate of each table set of each database. All these variations are within the spirit and scope of the invention.

A multi-tenancy data storage and access apparatus according to an embodiment of the invention will be described below with reference to FIG. 9. The apparatus can be used to implement the multi-tenancy data storage and access method according to an embodiment of the invention as described above. For brevity, in the following description, some contents redundant with the above described method are omitted.

Figure 9:
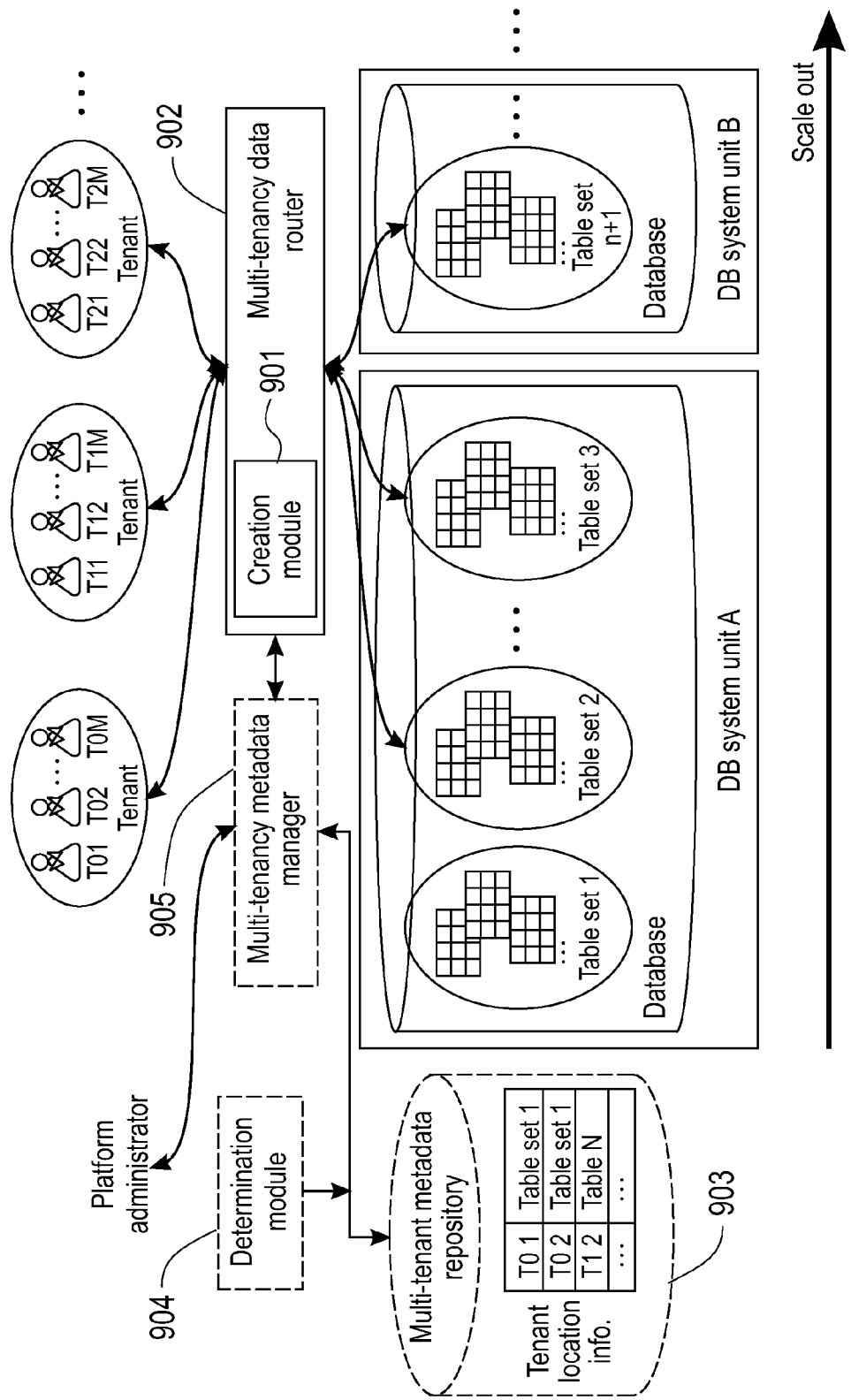
FIG. 9 shows a multi-tenancy data storage and access apparatus according to an embodiment of the present invention.

As shown in FIG. 9, the apparatus includes: a creation module 901 configured to create multiple table sets in one or more databases, wherein each table set is used to store the data of a group of tenants in the multiple tenants; and a multi-tenancy data router 902 configured to access the data of the tenant in a corresponding table set in response to receiving a data access request from a tenant.

The creation module 901 can either reside within the multi-tenancy data router 902 as part of the multi-tenancy The creation module 901 can either reside within the multi-tenancy data router 902 as part of the multi-tenancy data router 902, or reside outside the multi-tenancy data router 902 as a separate module.

Additionally, the one or more databases can be extended to more databases.

The apparatus may further include a multi-tenancy metadata repository 903 for recording corresponding relationships between tenants and table sets, i.e., the location information of the tenants. The multi-tenancy data router 902 may further be configured to find the corresponding table set by querying the metadata repository 903 in response to receiving a data access request from a tenant, and access the data of the tenant in the corresponding table set.

If the data access request contains a SQL statement for data access, the multi-tenancy data router 902 is further configured to extract and parse the SQL statement contained in the data request in response to receiving a data access request from a tenant, modify the SQL statement into a corresponding SQL statement for accessing the corresponding data of the tenant in a corresponding table set, and send the modified SQL statement to a corresponding database.

The multi-tenancy data storage and access apparatus may further include a determination module 904 configured to determine the maximum number of table sets and maximum table sharing rate of each database. Additionally, the creation module 902 may be further configured to create multiple table sets in the one or more databases according to the determined maximum number of table sets and maximum table sharing rate of each database.

According to one embodiment of the invention, the creation module 901 creates table sets in one or more databases using a minimum table set number policy. In such an embodiment, the creation module 901 may include: means for assigning the new tenant to a table set in response to a new tenant on-boarding if it is determined that there is a table set that has not reached the maximum table sharing rate in the current database; means for creating a new table set if it is determined that there is no table set that has not reached the maximum table sharing rate in the current database and it is determined that the number of table sets in the current database has not reached the maximum number of table sets, and assigning the new tenant to the new table set; and means for, otherwise, performing the above operations on the next database, until each of the one or more database contains the maximum number of table sets, and each table set reaches the maximum table sharing rate.

According to another embodiment of the invention, the creation module 901 uses a maximum performance policy to create table sets in one or more databases. In such an embodiment, the creation module 901 may include: means for creating a new table set in response to a new tenant on-boarding if it is determined that the number of table sets in the current database has not reached the maximum number of table sets, and assigning the new tenant to the new table set until the number of table sets in the current database reaches the maximum number of table sets; means for assigning the new tenant to the table set that has the least number of tenants in the current database if it is determined that the number of table sets in the current database has reached the maximum number of table sets until all the table sets in the current database reaches the maximum table sharing rate; and means for performing the above operations on the next database until each database of the one or more databases reaches the maximum number of table sets and each table set reaches the maximum table sharing rate.

According to an embodiment of the invention, the determination module 904 includes: means for creating emulation use cases reflecting the use of the multi-tenant application; means for executing the use cases against the multi-tenant application and the database, thereby obtaining the overall performance values of the multi-tenancy application under each table sharing rate of multiple table sharing rates and each level of the total number of tenants of multiple levels of the total number of tenants; and means for obtaining the maximum table sharing rate and maximum level of the total number of tenants based on the overall performance values and a required performance value required for each tenant, and further obtaining the maximum number of table sets of the database. Wherein obtaining the maximum table sharing rate and maximum level of the total number of tenants is further based on the percentage of decrease of the total number of tenants that can be tolerated by the provider of the multi-tenancy application, caused by the increase of the table sharing rate on the condition that the performance value required for each tenant remains unchanged.

According to a further embodiment of the invention, the means for obtaining the maximum table sharing rate and the level of the total number of tenants includes: means for obtaining the level of the total number of tenants satisfying the performance value required for each tenant when the table sharing rate is 1, based on the overall performance values under various levels of the total number of tenants when the table sharing rate is 1 and the performance value required for each tenant; means for obtaining the maximum level of the total number of tenants that can be accepted by the provider, based on the level of the total number of tenants satisfying the performance value required for each tenant and the percentage of decrease of the total number of tenants that can be tolerated by the provider of the multi-tenancy application; and means for obtaining the maximum table sharing rate by comparing the overall performances of the multi-tenancy application under various table sharing rates and the maximum level of the total number of tenants, and the overall performance satisfying the performance value required for each tenant under the maximum level of the total number of tenants.

It should be pointed out that the above description and illustration of the multi-tenancy data storage and access apparatus of the invention are only illustrative and not limitations to the invention. In other embodiment of the invention, the apparatus may have more, less or different modules, and the connection or containment relationships among the modules may be different from that described or illustrated.

For example, in some embodiments of the invention, the apparatus may further include a multi-tenancy metadata manager 905, wherein the multi-tenancy router 902 accesses the multi-tenancy metadata repository 903 through the multi-tenancy metadata manager 905. Additionally, the multi-tenancy metadata manager 905 may further be used to create the corresponding relationship between a tenant and a table set in the multi-tenancy metadata repository based on an appropriate policy when a new tenant is on-boarding.

In some embodiments of the invention, additionally or alternatively, the multi-tenancy data storage and access apparatus may further include a module for obtaining the actual use data of a multi-tenant application by monitoring the actual use of the multi-tenant application, a module for creating or modifying emulation use cases based on the actual use data of the multi-tenant application, and a module for executing the use cases on the multi-tenant application. The actual use data may be used to obtain an appropriate data sharing scheme. Further, in some embodiments of the invention, there may be no multi-tenancy metadata repository and/or determination module.

The invention can be realized in hardware, software, or a combination thereof. The invention can be realized in a computer system in a centralized manner, or in a distributed manner in which various components are distributed among several computer systems connected with each other. Any computer system or other apparatus suitable for carrying out the method described herein is applicable. A typical combination of hardware and software is a general-purpose computer with a computer program, which when being loaded and executed, controls the computer system to carry out the method of the invention, and constitute the apparatus of the invention.

The invention can also be embodied in a computer program product that contains all the features enabling implementation of the method described herein, and when being loaded into a computer system, causes the computer system to carry out the method.

While the invention has been illustrated and described by referring specifically to the preferred embodiments, those skilled in the art will understand that various changes may be made thereto both in form and detail without departing from the spirit and scope of the invention.

What we claim is:

1. A method of storing and accessing multi-tenancy data, the method comprising the steps of:
    creating a plurality of table sets in one or more databases, wherein each table set is used to store data of a group of tenants selected from a plurality of tenants;
    accessing data of a tenant in a table set in response to receiving a data access request from the tenant;
    recording relationships between the tenants and the table sets in a multi-tenancy metadata repository, wherein the step of accessing the data of the tenant comprises the steps of finding the table set by querying the metadata repository and accessing the data of the tenant in the table set based on the result received from the query of the metadata repository; and
    determining a maximum number of table sets and a maximum table sharing rate of each database, wherein the step of creating a plurality of table sets is performed according to the determined maximum number of table sets and maximum table sharing rate of each database;
    wherein the step of creating the plurality of table sets further comprises the steps of:
    assigning each new tenant to an already created table set in response to the new tenant on-boarding if it is determined that the table set has not reached the maximum table sharing rate in a current database;
    assigning each new tenant to a new table set if it is determined that there is no table set that has not reached the maximum table sharing rate in the current database and it is determined that the number of table sets in the current database has not reached the maximum number of table sets; and
    repeating the steps on the next database until each of the one or more databases contains the maximum number of table sets and each table set reaches the maximum table sharing rate.

2. The method of claim 1, wherein the data access request contains a SQL statement for data access and the step of accessing the data of the tenant comprises the steps of: (i) extracting the SQL statement contained in the data request: (ii) parsing the SQL statement contained in the data request: (iii) modifying the SQL statement into a corresponding SQL statement for accessing the data of the tenant in the table set and (iv) sending the modified SQL statement to a database storing the data of the tenant.

3. A method of storing and accessing multi-tenancy data, the method comprising the steps of:
    creating a plurality of table sets in one or more databases, wherein each table set is used to store data of a group of tenants selected from a plurality of tenants;
    accessing data of a tenant in a table set in response to receiving a data access request from the tenant;
    recording relationships between the tenants and the table sets in a multi-tenancy metadata repository, wherein the step of accessing the data of the tenant comprises the steps of finding the table set by querying the metadata repository and accessing the data of the tenant in the table set based on the result received from the query of the metadata repository; and
    determining a maximum number of table sets and a maximum table sharing rate of each database, wherein the step of creating a plurality of table sets is performed according to the determined maximum number of table sets and maximum table sharing rate of each database;
    wherein the step of creating the plurality of table sets further comprises:
    assigning each new tenant to a new table set until the number of table sets in a current database reaches the maximum number of table sets if it is determined that the number of table sets in the current database has not reached the maximum number of table sets;
    assigning each new tenant to a table set that has the least number of tenants in the current database until all the table sets in the current database reaches the maximum table sharing rate if it is determined that the number of table sets in the current database has reached the maximum number of table sets; and
    performing the above operations on the next database until each database of the one or more databases reaches the maximum number of table sets and each table set reaches the maximum table sharing rate.

4. A method of storing and accessing multi-tenancy data, the method comprising the steps of:
    creating a plurality of table sets in one or more databases, wherein each table set is used to store data of a group of tenants selected from a plurality of tenants;
    accessing data of a tenant in a table set in response to receiving a data access request from the tenant;
    recording relationships between the tenants and the table sets in a multi-tenancy metadata repository, wherein the step of accessing the data of the tenant comprises the steps of finding the table set by querying the metadata repository and accessing the data of the tenant in the table set based on the result received from the query of the metadata repository; and determining a maximum number of table sets and a maximum table sharing rate of each database, wherein the step of creating a plurality of table sets is performed according to the determined maximum number of table sets and maximum table sharing rate of each database;

wherein the step of determining the maximum number of table sets and the maximum table sharing rate comprises the steps of:

creating emulation use cases reflecting the use of a multi-tenant application under a plurality of table sharing rates and a plurality of total number of tenants;

executing the use cases against the multi-tenant application and a database in order to obtain overall performance values of the multi-tenancy application;

obtaining the maximum table sharing rate and a maximum level of the total number of tenants based on (i) the overall performance values, (ii) a required performance value required for each tenant and (iii) the percentage of decrease of the total number of tenants that can be tolerated by the provider of the multi-tenancy application, caused by the increase of the table sharing rate on the condition that the performance value required for each tenant remains unchanged; and obtaining the maximum number of table sets of the database.

5. The method according to claim 4, wherein the step of obtaining the maximum table sharing rate and the maximum level of the total number of tenants comprises the steps of:

obtaining the level of the total number of tenants satisfying the performance value required for each tenant when the table sharing rate is equal to 1 based on the overall performance values under various levels of the total number of tenants at that table sharing rate and the performance value required for each tenant;

obtaining the maximum level of the total number of tenants that can be accepted by the provider based on satisfying the performance value required for each tenant and the percentage of decrease of the total number of tenants that can be tolerated by the provider of the multi-tenancy application; and obtaining the maximum table sharing rate by comparing the overall performances of the multi-tenancy application under various table sharing rates, the maximum level of the total number of tenants, and the overall performance satisfying the performance value required for each tenant under the maximum level of the total number of tenants.

6. An apparatus for storing and accessing multi-tenancy data, comprising:

a memory;

a tangible non-transitory computer readable storage medium accessible to said memory;

at least one processor, coupled to said memory;

a creation processing module stored in said computer readable storage medium which, when loaded into said memory, causes said at least one processor to be operative to create a plurality of table sets in one or more databases, wherein each table set is used to store data of a group of tenants selected from a plurality of tenants;

a multi-tenancy data router stored in said computer readable storage medium which, when loaded into said memory, causes said at least one processor to be operative to access data of a tenant in a table set in response to receiving a data access request from the tenant; and a multi-tenancy metadata repository stored in said computer readable storage medium which, when loaded into said memory, causes said at least one processor to be operative to record the corresponding relationships between tenants and table sets;

wherein the multi-tenancy data router, when loaded into said memory, further causes said at least one processor to be operative to find the table set by querying the metadata repository and access the data of the tenant in the table set based on a result received from the query of the metadata repository;

further comprising a determination module stored in said computer readable storage medium which, when loaded into said memory, causes said at least one processor to be operative to determine a maximum number of table sets and maximum table sharing rate of each database, wherein the creation module, when loaded into said memory, further causes said at least one processor to create the plurality of table sets in the one or more databases according to the determined maximum number of table sets and maximum table sharing rate of each database;

wherein the creation module comprises:

means for assigning each new tenant to an already created table set in response to the new tenant on-boarding when it is determined that the table set has not reached the maximum table sharing rate in a current database;

means for assigning each new tenant to a new table set when it is determined that there is no table set that has not reached the maximum table sharing rate in the current database and when it is determined that the number of table sets in the current database has not reached the maximum number of table sets; and means for repeating the steps on the next database until each of the one or more databases contain the maximum number of table sets and each table set reaches the maximum table sharing rate.

7. The apparatus of claim 6, wherein the data access request contains a SQL statement for data access and the multi-tenancy data router, when loaded into said memory, further causes said at least one processor to (i) extract the SQL statement contained in the data request; (ii) parse the SQL statement contained in the data request; (iii) modify the SQL statement into a corresponding SQL statement for accessing the data of the tenant in the table set; and (iv) send the modified SQL statement to a database storing the data of the tenant.

8. An apparatus for storing and accessing multi-tenancy data, comprising:

a memory;

a tangible non-transitory computer readable storage medium accessible to said memory;

at least one processor, coupled to said memory;

a creation processing module stored in said computer readable storage medium which, when loaded into said memory, causes said at least one processor to be operative to create a plurality of table sets in one or more databases, wherein each table set is used to store data of a group of tenants selected from a plurality of tenants;

a multi-tenancy data router stored in said computer readable storage medium which, when loaded into said memory, causes said at least one processor to be operative to access data of a tenant in a table set in response to receiving a data access request from the tenant; and a multi-tenancy metadata repository stored in said computer readable storage medium which, when loaded into said memory, causes said at least one processor to be operative to record the corresponding relationships between tenants and table sets;

wherein the multi-tenancy data router, when loaded into said memory, further causes said at least one processor to be operative to find the table set by querying the metadata repository and access the data of the tenant in the table set based on a result received from the query of the metadata repository;

further comprising a determination module stored in said computer readable storage medium which, when loaded into said memory, causes said at least one processor to be operative to determine a maximum number of table sets and maximum table sharing rate of each database, wherein the creation module, when loaded into said memory, further causes said at least one processor to create the plurality of table sets in the one or more databases according to the determined maximum number of table sets and maximum table sharing rate of each database;

wherein the creation module comprises:

means for assigning each new tenant to a new table set until the number of table sets in a current database reaches the maximum number of table sets if it is determined that the number of table sets in the current database has not reached the maximum number of table sets;

means for assigning each new tenant to a table set that has the least number of tenants in the current database until all the table sets in the current database reaches the maximum table sharing rate if it is determined that the number of table sets in the current database has reached the maximum number of table sets; and means for performing the above operations on the next database until each database of the one or more databases reaches the maximum number of table sets and each table set reaches the maximum table sharing rate.

9. An apparatus for storing and accessing multi-tenancy data, comprising:
a memory;
a tangible non-transitory computer readable storage medium accessible to said memory;
at least one processor, coupled to said memory;
a creation processing module stored in said computer readable storage medium which, when loaded into said memory, causes said at least one processor to be operative to create a plurality of table sets in one or more databases, wherein each table set is used to store data of a group of tenants selected from a plurality of tenants;
a multi-tenancy data router stored in said computer readable storage medium which, when loaded into said memory, causes said at least one processor to be operative to access data of a tenant in a table set in response to receiving a data access request from the tenant; and
a multi-tenancy metadata repository stored in said computer readable storage medium which, when loaded into said memory, causes said at least one processor to be operative to record the corresponding relationships between tenants and table sets;
wherein the multi-tenancy data router, when loaded into said memory, further causes said at least one processor to be operative to find the table set by querying the metadata repository and access the data of the tenant in the table set based on a result received from the query of the metadata repository;
further comprising a determination module stored in said computer readable storage medium which, when loaded into said memory, causes said at least one processor to be operative to determine a maximum number of table sets and maximum table sharing rate of each database, wherein the creation module, when loaded into said memory, further causes said at least one processor to create the plurality of table sets in the one or more databases according to the determined maximum number of table sets and maximum table sharing rate of each database;

wherein said determination module comprises:

means for creating emulation use cases reflecting the use of a multi-tenant application under a plurality of table sharing rates and a plurality of total number of tenants;

means for executing the use cases against the multi-tenant application and a database to obtain overall performance values of the multi-tenancy application;

means for obtaining the maximum table sharing rate and a maximum level of the total number of tenants based on (i) the overall performance values, (ii) a required performance value required for each tenant and (iii) the percentage of decrease of the total number of tenants that can be tolerated by the provider of the multi-tenancy application, caused by the increase of the table sharing rate on the condition that the performance value required for each tenant remains unchanged; and means for obtaining the maximum number of table sets of the database.

10. The apparatus according to claim 9, wherein the means for obtaining the maximum table sharing rate and the level of the total number of tenants comprises:

means for obtaining the level of the total number of tenants satisfying the performance value required for each tenant when the table sharing rate is equal to 1 based on the overall performance values under various levels of the total number of tenants at that table sharing rate and the performance value required for each tenant;

means for obtaining the maximum level of the total number of tenants that can he accepted by the provider based on satisfying the performance value required for each tenant and the percentage of decrease of the total number of tenants that can be tolerated by the provider of the multi-tenancy application; and means for obtaining the maximum table sharing rate by comparing the overall performances of the multi-tenancy application under various table sharing rates, the maximum level of the total number of tenants, and the overall performance satisfying the performance value required for each tenant under the maximum level of the total number of tenants.

11. An article of manufacture comprising a computer program product for storing and accessing multi-tenancy data, said computer program product comprising:
a tangible non-transitory computer-readable storage medium, storing in a non-transitory manner computer readable program code, the computer readable program code comprising:
computer readable program code configured to create a plurality of table sets in one or more databases, wherein each table set is used to store data of a group of tenants selected from a plurality of tenants;
computer readable program code configured to access data of a tenant in a table set in response to receiving a data access request from the tenant;
computer readable program code configured to record relationships between the tenants and the table sets in a multi-tenancy metadata repository, wherein the computer readable program code configured to access the data of the tenant comprises computer readable program code configured to perform the steps of finding the table set by querying the metadata repository and accessing the data of the tenant in the table set based on the result received from the query of the metadata repository; and computer readable program code configured to determine a maximum number of table sets and a maximum table sharing rate of each database, wherein the computer readable program code configured to create a plurality of table sets creates the plurality of table sets according to the determined maximum number of table sets and maximum table sharing rate of each database;

wherein the computer readable program code configured to create the plurality of table sets further comprises:

computer readable program code configured to assign each new tenant to an already created table set in response to the new tenant on-boarding if it is determined that the table set has not reached the maximum table sharing rate in a current database;

computer readable program code configured to assign each new tenant to a new table set if it is determined that there is no table set that has not reached the maximum table sharing rate in the current database and it is determined that the number of table sets in the current database has not reached the maximum number of table sets; and computer readable program code configured to repeat the steps on the next database until each of the one or more databases contains the maximum number of table sets and each table set reaches the maximum table sharing rate.

* * * * *